United States Patent
Lim et al.

(10) Patent No.: US 8,400,904 B2
(45) Date of Patent: Mar. 19, 2013

(54) HIERARCHICAL-CELL COMMUNICATION SYSTEM USING ASYMMETRIC FEEDBACK SCHEME BASED ON CLASS OF ACCESS NETWORK

(75) Inventors: Jong Bu Lim, Yongin-si (KR); Kyung Hun Jang, Suwon-si (KR); Hyo Sun Hwang, Seoul (KR); Hyun Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 12/790,765

(22) Filed: May 28, 2010

(65) Prior Publication Data

US 2011/0128939 A1    Jun. 2, 2011

(30) Foreign Application Priority Data

Dec. 2, 2009   (KR) .................. 10-2009-0118130

(51) Int. Cl.
- *H04J 11/00* (2006.01)
- *H04B 7/216* (2006.01)
- *H04B 7/02* (2006.01)
- *H04W 4/00* (2009.01)

(52) U.S. Cl. ........ 370/203; 370/319; 370/328; 370/338; 370/342; 375/267

(58) Field of Classification Search .................. 370/203, 370/252, 254, 315–320, 328–335, 338–339, 370/341–344; 375/260, 267, 299, 367; 455/11.1–25, 39, 69, 427–444, 447–454, 455/464
See application file for complete search history.

(56) References Cited

U.S. PATENT DOCUMENTS

| | | | |
|---|---|---|---|
| 7,260,748 B2 * | 8/2007 | Wong et al. ..................... 714/43 |
| 8,254,487 B2 * | 8/2012 | Tsai et al. ..................... 375/267 |
| 2001/0027103 A1 | 10/2001 | Willingham et al. |
| 2007/0211757 A1 * | 9/2007 | Oyman ......................... 370/468 |
| 2009/0041150 A1 | 2/2009 | Tsai et al. |
| 2010/0103044 A1 * | 4/2010 | Hoshino et al. ............... 342/372 |
| 2011/0261894 A1 * | 10/2011 | Yu et al. ....................... 375/267 |
| 2012/0014242 A1 * | 1/2012 | Kim et al. ..................... 370/203 |
| 2012/0069926 A1 * | 3/2012 | Park et al. ..................... 375/267 |
| 2012/0134275 A1 * | 5/2012 | Choi et al. .................... 370/241 |

FOREIGN PATENT DOCUMENTS

| | | |
|---|---|---|
| EP | 1962539 A1 | 8/2008 |
| JP | 11-252636 | 9/1999 |
| JP | 2001-127699 | 5/2001 |
| KR | 10-1997-0055730 | 7/1997 |
| KR | 10-2001-0017137 | 3/2001 |

(Continued)

OTHER PUBLICATIONS

International Search Report issued Feb. 1, 2011 in counterpart International Application No. PCT/KR2010/004022 (3 pages, in English).

*Primary Examiner* — Tri H Phan
(74) *Attorney, Agent, or Firm* — NSIP Law

(57) ABSTRACT

A small cell communication system may reduce interference occurring in a macro terminal through beamforming, even when using the same frequency resources as used by a macro communication system. For example, the small cell communication system may use a larger amount of radio resources than the macro communication system for transmission of feedback information in an uplink. For example, the small cell communication system may use a codebook having a larger size than a size of a codebook used by the macro communication system.

23 Claims, 12 Drawing Sheets

FOREIGN PATENT DOCUMENTS

| | | |
|---|---|---|
| KR | 10-2003-0033500 | 5/2003 |
| KR | 10-2009-0004164 A | 1/2009 |
| KR | 10-0883268 | 2/2009 |
| KR | 10-2009-0037636 | 4/2009 |

* cited by examiner

HIERARCHICAL-CELL COMMUNICATION SYSTEM USING ASYMMETRIC FEEDBACK SCHEME BASED ON CLASS OF ACCESS NETWORK

CROSS-REFERENCE TO RELATED APPLICATION(S)

This application claims the benefit of Korean Patent Application No. 10-2009-0118130, filed on Dec. 2, 2009, in the Korean Intellectual Property Office, the entire disclosure of which is incorporated herein by reference for all purposes.

BACKGROUND

1. Field

The following technology relates to a technology that reduces interference in a macro cell communication system when the macrocell and a small cell use the same radio resources.

2. Description of Related Art

Recently, an interest in small cell communication systems, such as a femtocells, picocells, and the like, have increased. Unlike macrocells permanently installed by service providers, the small cells may be freely installed by users. At least one macrocell and at least one small cell may construct a hierarchical cell communication system.

The hierarchical cell communication system may establish at least one small cell in a predetermined location, to obtain a high capacity of system resources in the predetermined location. However, interference may occur in the macrocell due to the small cell. The interference may reduce system throughput and cause a loss of data.

SUMMARY

In one general aspect, there is provided a method of a target terminal, comprising storing a first codebook for a macro base station and a second codebook for a small base station, selecting the second codebook, allocating feedback resources corresponding to the second codebook, generating feedback information associated with a channel between the small base station and the target terminal using the second codebook, and transmitting, to the small base station, the feedback information using the allocated feedback resources.

A size of the second codebook may be greater than a size of the first codebook.

The generating may comprise selecting at least one of a plurality of codewords included in the second codebook based on the channel between the small base station and the target terminal, wherein the feedback information includes a preferred matrix index (PMI) associated with the at least one of a plurality of codewords included in the second codebook.

The feedback information may further include channel quality information (CQI) associated with the channel and/or a rank indicator (RI) indicating a preferred channel rank.

The method may further comprise estimating the channel between the small base station and the target terminal using a known signal transmitted from the small base station.

The allocating may allocate feedback resources, and the amount of allocated feedback resources corresponds to a size of the second codebook.

The method may further comprise determining a base station that the target terminal accesses from among the macro base station and the small base station.

When the target terminal accesses the macro base station, and the method may further comprise selecting the first codebook from among the first codebook and the second codebook, allocating feedback resource corresponding to the first codebook, generating feedback information associated with a channel between the macro base station and the target terminal using the first codebook, and transmitting the feedback information, to the macro base station, using the allocated feedback resources.

In another aspect, there is provided a method of a target terminal, comprising determining a base station that the target terminal accesses from among a macro base station and a small base station, allocating feedback resources when the target terminal accesses the small base station, wherein the amount of allocated feedback resources corresponds to a predetermined amount of allocated feedback resources for the small base station, generating feedback information associated with a channel between the small base station and the target terminal based on the allocated feedback resource, and transmitting, to the small base station, the feedback information using the allocated feedback resources.

The allocating may allocate a larger amount of feedback resources when the target terminal accesses the small base station than when the target terminal accesses the macro base station.

The method may further comprise estimating the channel between the small base station and the target terminal using a known signal transmitted from the small base station, wherein the generating comprises quantizing the estimated channel based on the allocated feedback resources.

In another aspect, there is provided a method of a small base station, comprising allocating feedback resources corresponding to a second codebook for a small base station, the second codebook being distinguished from a first codebook for a macro base station, analyzing, based on the second codebook, feedback information transmitted through the feedback resources, the feedback information being associated with a channel between a target terminal and the small base station, recognizing or predicting a channel between the small base station and a macro terminal corresponding to the macro base station, and constructing a beamforming matrix for the target terminal based on the feedback information and the channel between the small base station and the macro terminal.

The recognizing or predicting may include at least one of recognizing or predicting the channel between the small base station and the macro terminal by receiving, from the macro base station, information associated with the channel between the small base station and the macro terminal, or recognizing or predicting the channel between the small base station and the macro terminal based on a channel reciprocity.

A size of the second codebook may be greater than a size of the first codebook.

The constructing may construct the beamforming matrix based on an interference occurring in the macro terminal due to the small base station.

The analyzing may comprise determining, from the feedback information, a PMI of the target terminal associated with at least one of a plurality of codewords included in the second codebooks.

In another aspect, there is provided a method of a small base station, comprising allocating feedback resources when a target terminal accesses the small base station, the amount of allocated feedback resources corresponding to a predetermined amount for the small base station, analyzing feedback information transmitted through the feedback resources, the feedback information being generated by quantizing a channel between the target terminal and the small base station, recognizing or predicting the channel between the small base station and a macro terminal corresponding to a macro base station, and constructing a beamforming matrix for the target terminal based on the feedback information and the channel between the small base station and the macro terminal.

The allocating may allocate a larger amount of feedback resources when the target terminal accesses the small base station than when the target terminal accesses the macro base station.

In another aspect, there is provided a computer-readable storage medium having stored therein instructions for causing a processor to implement a method of a target terminal, the method comprising storing a first codebook for a macro base station and a second codebook for a small base station, selecting the second codebook, allocating feedback resources corresponding to the second codebook, generating feedback information associated with a channel between the small base station and the target terminal using the second codebook, and transmitting, to the small base station, the feedback information using the allocated feedback resources.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
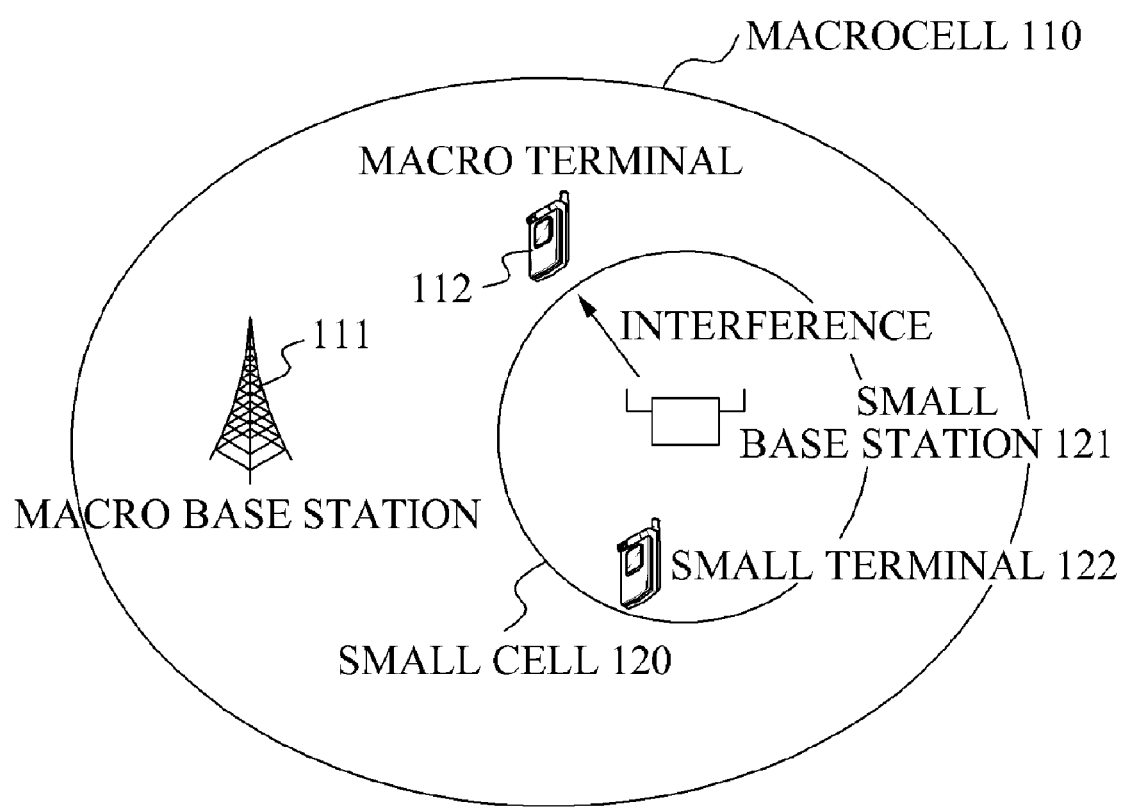
FIG. 1 is a diagram illustrating an example of a hierarchical cell communication system including a macrocell and a small cell.

FIG. 1 illustrates an example of a hierarchical cell communication system including a macrocell and a small cell.

Referring to FIG. 1, the example hierarchical cell communication system includes a macro cell 110 and a small cell 120 disposed within the macro cell 110. In this example, the macrocell 110 includes a macro base station 111 and a macro terminal 112, and the small cell 120 includes a small base station 121 and a small terminal 122. For example, the small base station 121 may include a femto base station, a pico base station, and the like, and may also include a communication device capable of serving as a terminal, such as a relay station and the like. The small terminal 122 indicates a communication device served by the small base station 121, and may include, for example, a portable phone, a notebook, a personal digital assistance (PDA), and the like.

A high quality multimedia service may be provided to the small terminal 122 existing in a predetermined location of the small cell 120 in the hierarchical cell communication system. A signal transmitted from the small base station 121 may interfere with the macro terminal 112. Previously, two different schemes were proposed to reduce interference.

According to the first scheme, the small cell 120 may use frequency resources different from frequency resources used by the macrocell 110, preventing the interference occurring in the macro cell 110. According to a second scheme, the small cell 120 may recognize an interference channel between the macro terminal 112 and the small base station 121, and may adjust a transmission power based on the interference channel to reduce the amount of interference occurring in the macro terminal 112.

However, in the first scheme, the macrocell 110 and the small cell 120 use different frequency resources, and therefore they do not improve a reusing rate of the frequency resources. Also, the second scheme may have weakness where a coverage of the small cell 120 is changed by the macro cell 110.

Accordingly, proposed herein is a method to reduce interference that occurs in the macro terminal 112. A small base station 121 may construct a beamforming matrix based on an interference channel and a channel between the small base station 121 and the small terminal 122.

For example, a relatively large number of macro terminals may access the macro base station 111 in the macro cell 110. Thus, a smaller amount of radio resources may be allocated to each individual macro terminal for the transmission of feedback information. For example, the number of small terminals accessing the small base station 121 may be smaller, and thus, each of the small terminals may be allocated a larger amount of resources for the transmission of feedback information. For example, all terminals may transmit a total of an 8-bit preferred matrix index (PMI) in an uplink. Accordingly, when four macro terminals exist, each of the macro terminals may transmit an 8/4=2-bit PMI. Alternatively, when two macro terminals exist, each of the macro terminals may transmit an 8/2=4-bit PMI.

In some embodiments, the small terminals may use a larger amount of radio resources to transmit the feedback information. This may indicate that the small base station 121 may construct a more optimal beamforming matrix. When the small cell 120 is a codebook-based communication system, the small base station 121 and the small terminal 122 may use a relatively larger size codebook compared with the macrocell 110. For example, the macro terminal 112 may feed back a 2-bit PMI to the macro base station 111, whereas the small terminal 122 that accesses the small base station 121 may feed back a 4-bit PMI to the small base station 121. Accordingly, the macro cell 110 may use a 2-bit codebook, whereas the small cell 120 may use a 4-bit codebook. In this example, a larger number of candidate beams, for example, $2^4=16$ candidate beams may exist in the small base station 121, and the small base station 121 may construct a beamforming matrix corresponding to an optimal candidate beam among the candidate beams.

According to example embodiments, the amount of feedback information generated/transmitted by a terminal may be changed based on whether the terminal accesses the macro base station 111 or the small base station 121. The example embodiments may use an asymmetric feedback scheme based on a class of an access network of the terminal.

Figure 2:
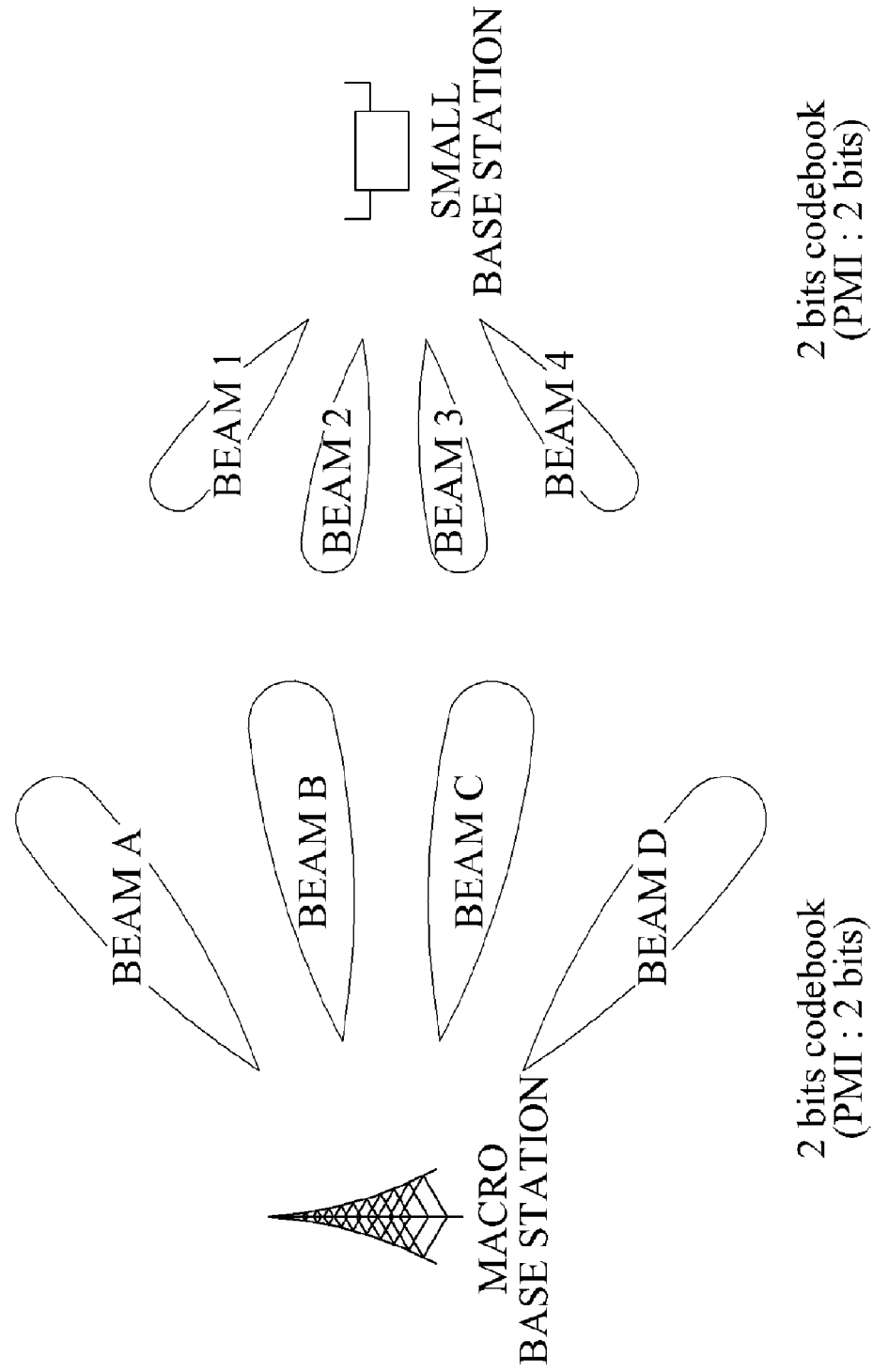
FIG. 2 is a diagram illustrating an example of a macro base station and a small base station that both use the same sized codebook.

FIG. 2 illustrates an example of a macro base station and a small base station, that both use the same sized codebook.

Referring to FIG. 2, the macro base station may use four candidate beams, for example, beams A, B, C, and D, and the small base station may also use four candidate beams, for example, beams 1, 2, 3, and 4. When both a macrocell communication system and a small cell communication system are codebook-based communication systems, each of the macrocell communication system and the small cell communication system may use a 2-bit codebook.

A macro terminal served by the macro base station may estimate a channel between the macro base station and the macro terminal, and may generate feedback information. For example, the feedback information may include a PMI, channel quality information (CQI), a preferred rank indicator (RI), and the like. The macro terminal may select a preferred matrix from a codebook based on the channel, for example, based on the PMI, the CQI, and/or the RI. The macro terminal may select, as the preferred matrix, one of four codewords included in the 2-bit codebook, and may feed back, to the base station, a 2-bit PMI indicating the preferred matrix index. In addition, the macro terminal may feed back, to the macro base station, the CQI indicating a quality of the channel and the RI indicating a preferred channel rank. In this example, the macro base station may construct a beamforming matrix corresponding to an optimal beam from among the four candidate beams, for example, the beams A, B, C, and D. The beamforming matrix may be based on the feedback information.

A small terminal may estimate a channel between the small terminal and the small base station, and may generate a 2-bit PMI from the 2-bit codebook based on the estimated channel. The small terminal may generate CQI associated with the channel and an RI, and may transmit, to the small base station, the generated PMI, the generated CQI, and the generated RI, as feedback information. In this example, the small base station may recognize an interference channel between the small base station and the macro terminal, and may construct a beamforming matrix corresponding to an optimal beam from among the four candidate beams, for example, the beams 1, 2, 3, and 4, based on the interference channel and the feedback information transmitted from the small terminal. The small base station may construct a beamforming matrix based on the interference occurring in the macro terminal in addition to the PMI of the small terminal.

For example, when a number of candidate beams that may be used by the small base station increases, a possibility of increasing a capacity to the small terminal while decreasing interference occurring in the macro terminal increases. When the number of candidate beams that may be used by the small base station increases, the quantized error of a codebook used by the small base station may decrease, and thus, the small base station may determine the channel between the small terminal and the small base station. The small base station may more precisely determine the channel between the small terminal and the small base station, further reducing interference occurring in the macro terminal, due to the small base station.

As described above, the small cell generally serves a smaller number of terminals than the macro terminal. Thus, an uplink feedback overhead may be limited less strictly in the small cell than the macro cell. Accordingly, example embodiments may allocate a large amount of radio resources for feedback information of the small cell to enable the small cell to transmit/receive a relatively large amount of feedback information.

Figure 3:
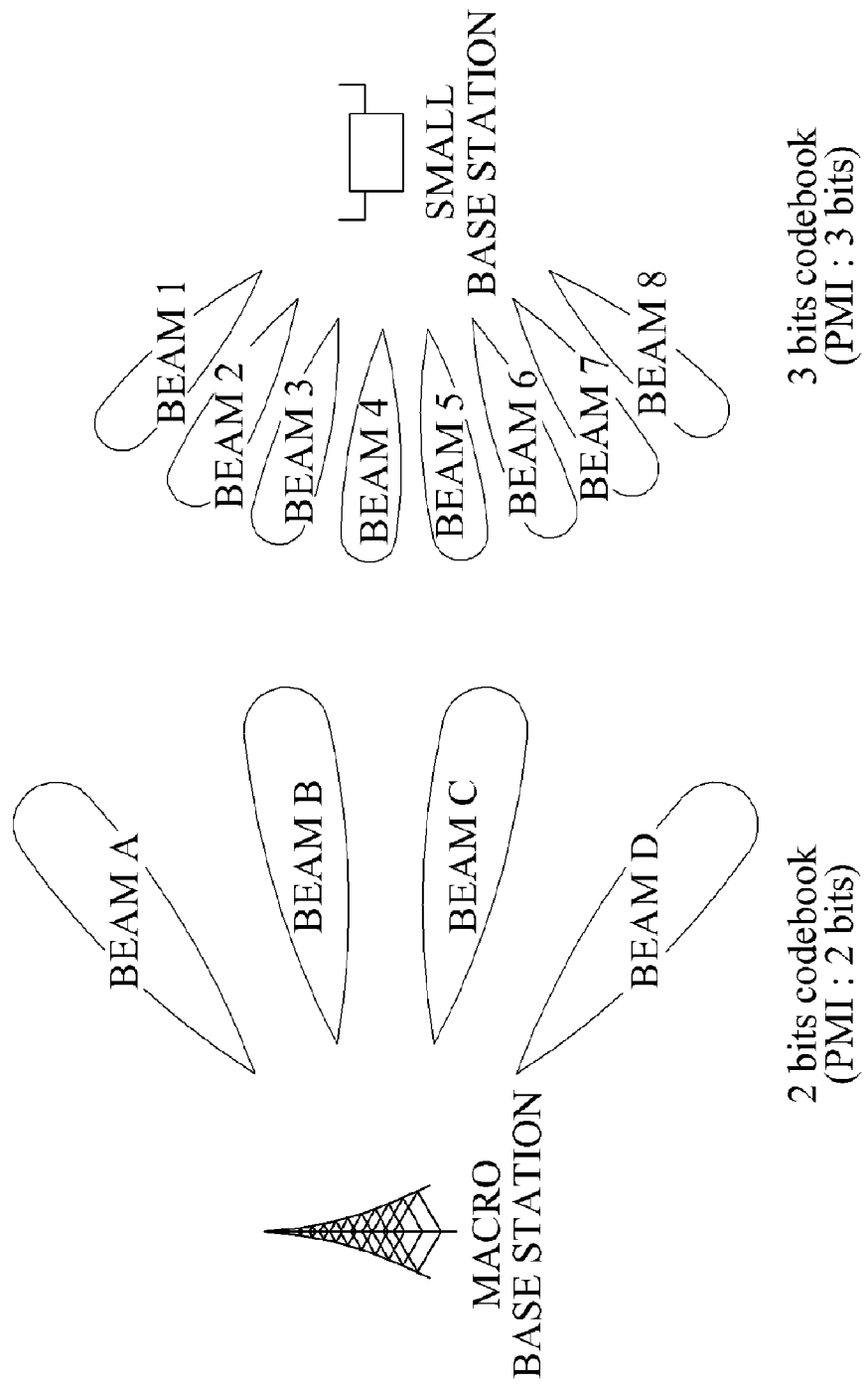
FIG. 3 is a diagram illustrating an example of a small base station that uses a codebook greater in size than a codebook used by a macro base station.

FIG. 3 illustrates an example of a small base station that uses a codebook greater in size than the size of a codebook used by a macro base station.

Referring to FIG. 3, the macro base station may use a 2-bit codebook, whereas the small base station may use a 3-bit codebook. For example, each of macro terminals may generate and transmit a 2-bit PMI, whereas each of small terminals may generate and transmit a 3-bit PMI. The macro base station may select one of four candidate beams, for example, beams A, B, C, and D, because the 2-bit codebook includes four codewords (i.e., $2^2=4$), whereas the small base station may select one of eight candidate beams (i.e., $2^3=8$), for example, beams 1 to 8, because the 3-bit codebook includes eight codewords.

The small base station may have a larger size codebook, having a relatively larger number of candidate beams. Accordingly, the small base station may construct an optimal beamforming matrix that may maximize a capacity to the small terminals with a high possibility and may simultaneously reduce an interference to the macro terminals. In this example, although each of the small terminals may have a burden of feeding back a larger amount of PMI or feedback information to the small base station, generating the larger amount of PMI is not difficult for each of the small terminals, because feedback overhead is not as limited in a small cell.

Each of the small terminals may transmit a larger amount of feedback information to the small base station, and thus, the small base station may allocate, to each of the small terminals, a larger amount of radio resources for the feedback information.

Figure 4:
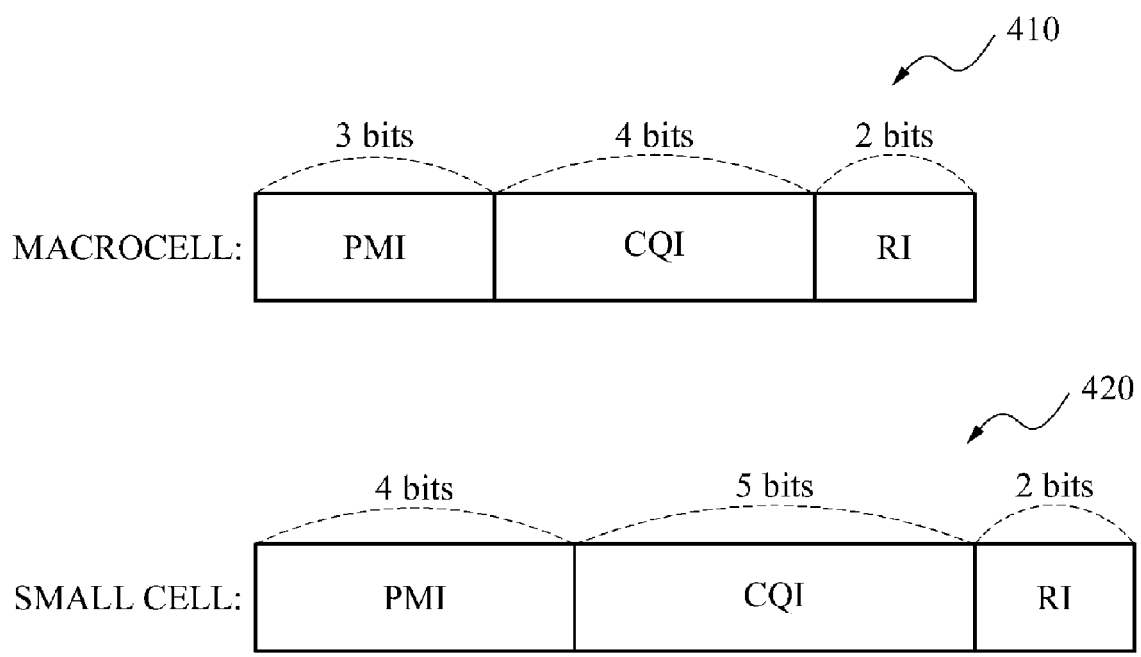
FIG. 4 is a diagram illustrating an example format of feedback information.

FIG. 4 illustrates an example format of feedback information.

Feedback information 410 may be a 9-bit feedback information transmitted/received by a macro cell, and feedback information 420 may be an 11-bit feedback information transmitted/received by a small cell. In this example, a macro cell communication system and a small cell communication system are codebook-based communication systems.

Feedback information may include a PMI and a CQI associated with a corresponding channel, and may include a preferred RI of a corresponding terminal. According to the example format of the feedback information of FIG. 4, each of macro terminals may generate and transmit a 3-bit PMI. Accordingly, a macro base station and the macro terminals may use a 3-bit codebook. In some embodiments, each of the macro terminals may generate and transmit a 4-bit CQI associated with a corresponding channel and an RI. Conversely, each of small terminals may generate and transmit a 4-bit PMI, and thus, a small base station and the small terminals may use a 4-bit codebook. Also, each of the small terminals may generate a 5-bit CQI associated with a corresponding channel and an RI.

In this example, the total amount of feedback information that is generated and transmitted by each of the small terminals is 11 bits, whereas a total amount of feedback information that is generated and transmitted by each of the macro terminals is 9 bits. Accordingly, each of the small terminals may use a larger amount of radio resources for the feedback information. Thus, the small base station may allocate radio resources to enable each of the small terminals to successfully transmit the feedback information.

For reference, the feedback information may include various indicators or a variety of information, in addition to the PMI, the CQI, and the RI. For example, the feedback information may include a quantized channel as is, an index of a matrix that is not preferred, and the like.

Figure 5:
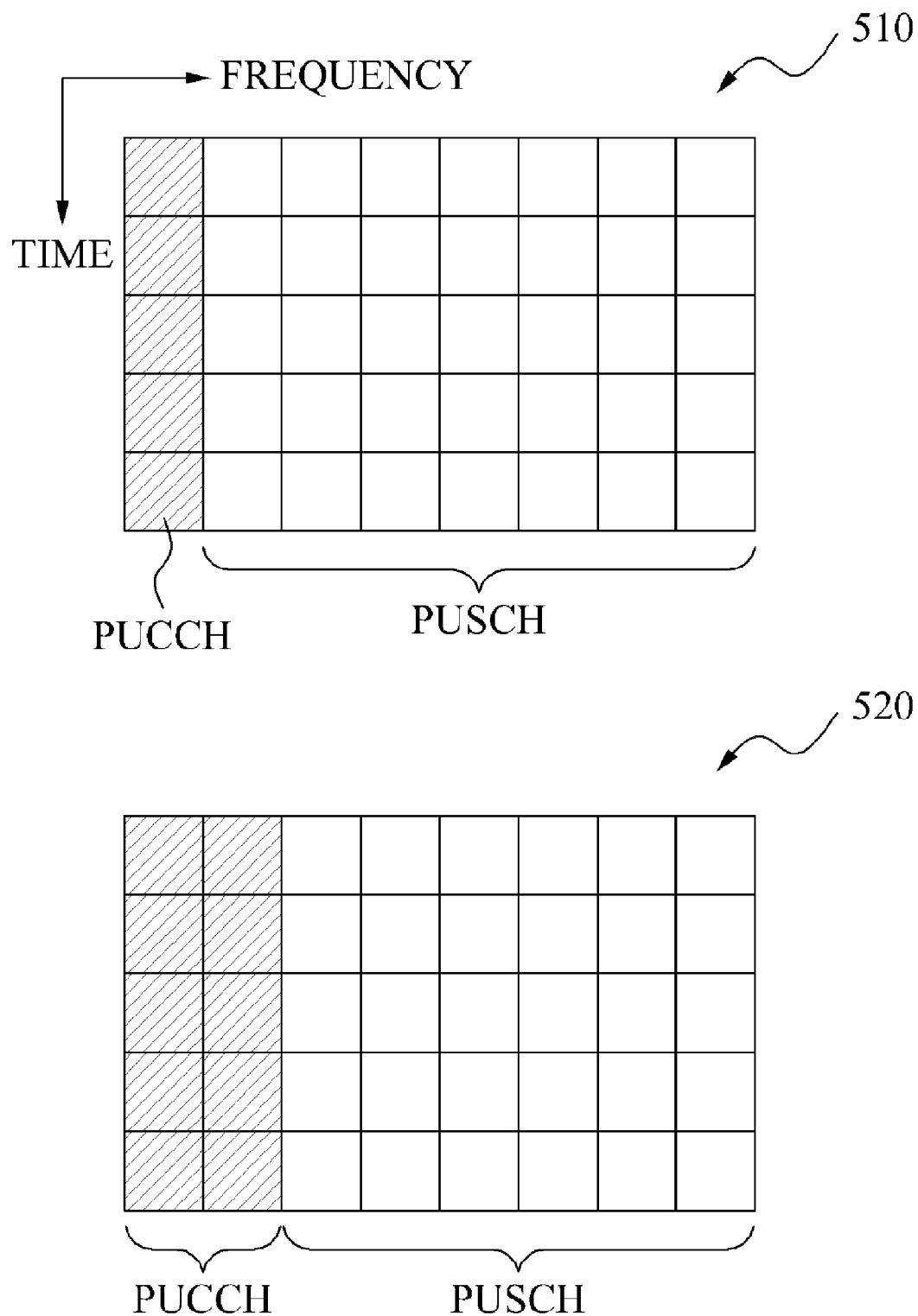
FIG. 5 is a diagram illustrating an example of radio resources used for transmitting feedback information.

FIG. 5 illustrates an example of radio resources used for transmitting feedback information.

Grid 510 of radio resources may indicate radio resources for a physical uplink control channel (PUCCH) and radio resources for a physical uplink shared channel (PUSCH) in a macro cell. For example, feedback information including a PMI, CQI, an RI, and the like may be transmitted, to a macro base station, from each of macro terminals using the radio resources for the PUCCH in the macro cell.

Grid 520 may indicate radio resources for PUCCH and radio resources for PUSCH in a small cell. The grid 520 may allocate a larger amount of radio resources as the radio resources for the PUCCH, compared with the grid 510. The small cell may include a smaller number of small terminals, and thus, each of small terminals may use a larger amount of radio resource for the PUCCH. Accordingly, the small terminals may transmit a larger amount of feedback information to the small base station.

An amount of radio resources allocated to a predetermined terminal may be changed depending on a base station that the predetermined terminal accesses from among the macro base station and the small base station. When the predetermined terminal accesses the macro base station, the predetermined terminal may be scheduled based on the grid 510, and when the predetermined terminal accesses the small base station, the predetermined terminal may be scheduled based on the grid 520.

Figure 6:
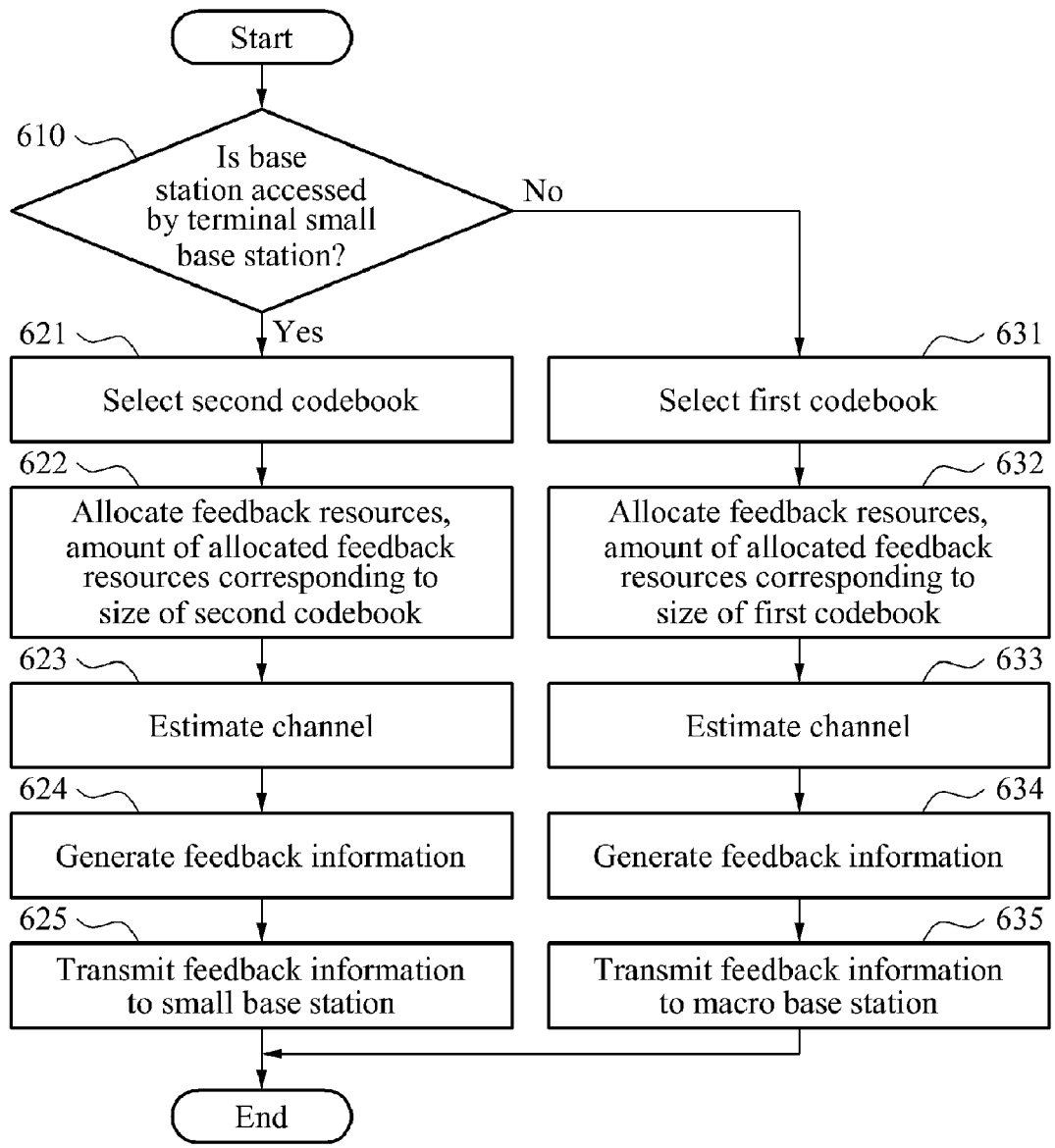
FIG. 6 is a flowchart illustrating an example of a method of a terminal in a codebook-based communication system.

FIG. 6 illustrates an example of a method of a terminal in a codebook-based communication system.

Referring to FIG. 6, in operation 610 a target terminal determines whether a base station that the target terminal is accessing is a small base station. A codebook used by the target terminal, a format of feedback information of the target terminal, and radio resources for the feedback information may be changed based on whether the target terminal accesses the small base station or a macro base station.

When the base station accessed by the target terminal is the small base station, in operation 621 the target terminal selects a second codebook. In this example, the small cell uses the second codebook, and the macro cell uses a first codebook. Also in this example, the size of the second codebook may be greater than the size of the first codebook.

In operation 622, the target terminal may allocate feedback resources in response to a command of the small base station or independently from the command of the small base station. The amount of allocated feedback resources may be based on the size of the second codebook. In this example, the feedback resources may be radio resources used by the target terminal for transmitting the feedback information to the small base station.

For example, when the size of the second codebook is 3 bits, the target terminal may allocate 3 bits for a PMI, and may also allocate a predetermined number of bits for CQI and an RI. The target terminal may allocate feedback resources for transmission of all the PMI, the CQI, and the RI.

The target terminal estimates a channel between the target terminal and the small base station in operation 623. For example, the target terminal may estimate a downlink channel from the target base station to the target terminal, based on a known signal such as a pilot signal transmitted from the small base station.

In operation 624, the target terminal may generate feedback information including the PMI, the CQI, and the RI based on the estimated channel. The target terminal may select one of a plurality of codewords included in the second codebook based on the estimated channel, and may generate an index of the selected codeword as the PMI. The target terminal may generate the CQI indicating a quality of the estimated channel and the RI indicating a preferred rank.

In operation 625, the target terminal transmits the generated feedback information to the small base station. In this example, the target terminal may transmit, to the small base station, the feedback information using feedback resources that are allocated in advance. The small base station recognizes the format of the feedback information and feedback resources used by the target terminal. Accordingly, the small base station may successfully receive the feedback information.

When the base station accessed by target terminal in operation 610 is the macro base station, in operation 631 the target terminal selects the first codebook. In this example, generally, the size of the first codebook is designed to be smaller than the size of the second codebook.

The target terminal allocates feedback resources in operation 632. The amount of the allocated resources may be based on the size of the first codebook. In this example, the size of the first codebook is generally smaller than the size of the second codebook, and thus, the amount of feedback resources allocated in operation 632 may be smaller than the amount of feedback resources allocated in operation 622.

In operation 633, the target terminal estimates a channel between the target terminal and the macro base station. For example, the target terminal may estimate a downlink channel to the target terminal from the macro base station based on a known signal, such as a pilot signal transmitted from the macro base station.

In operation 634, the target terminal generates feedback information including a PMI, CQI, and an RI, based on the estimated channel. In addition, the target terminal may transmit, to the macro base station, the feedback information using the feedback resources allocated in operation 632 and in operation 635.

Figure 7:
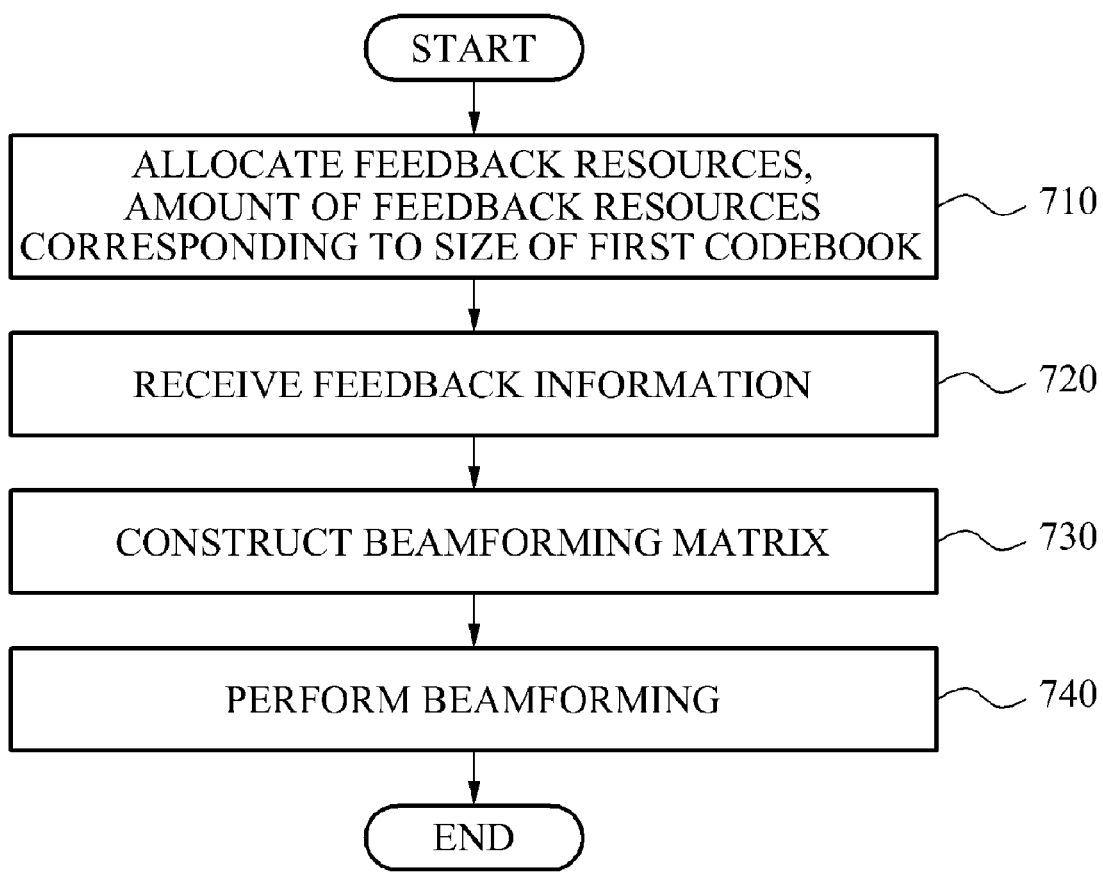
FIG. 7 is a flowchart illustrating an example of a method of a macro base station in a codebook-based communication system.

FIG. 7 illustrates an example of a method of a macro base station in a codebook-based communication system.

Referring to FIG. 7, when a target terminal accesses the macro base station, the macro base station may allocate feedback resources in operation 710, and the amount of allocated feedback resources may be based on the size of a first codebook. Also, the target terminal may estimate a channel between the macro base station and the target terminal, and may generate feedback information including a PMI, CQI, and an RI, based on the estimated channel. The target terminal may transmit, to the macro base station, the feedback information using the feedback resources.

In operation 720, the macro base station receives the feedback information transmitted from the target terminal using the feedback resources allocated in advance. The macro base station may determine the PMI, the CQI, and the RI included in the feedback information.

In operation 730, the macro base station constructs a beamforming matrix for the target terminal based on the PMI, the CQI, and the RI of the target terminal In operation 740, the macro base station may perform beamforming of at least one data stream to be transmitted, based on the constructed beamforming matrix.

A macro cell, in general, has a higher priority than a small cell, and thus, the macro base station may not be affected by interference to the small cell caused by the macro cell. Accordingly, the macro base station may construct the beamforming matrix regardless of an interference channel to the small cell from the macro cell.

Figure 8:
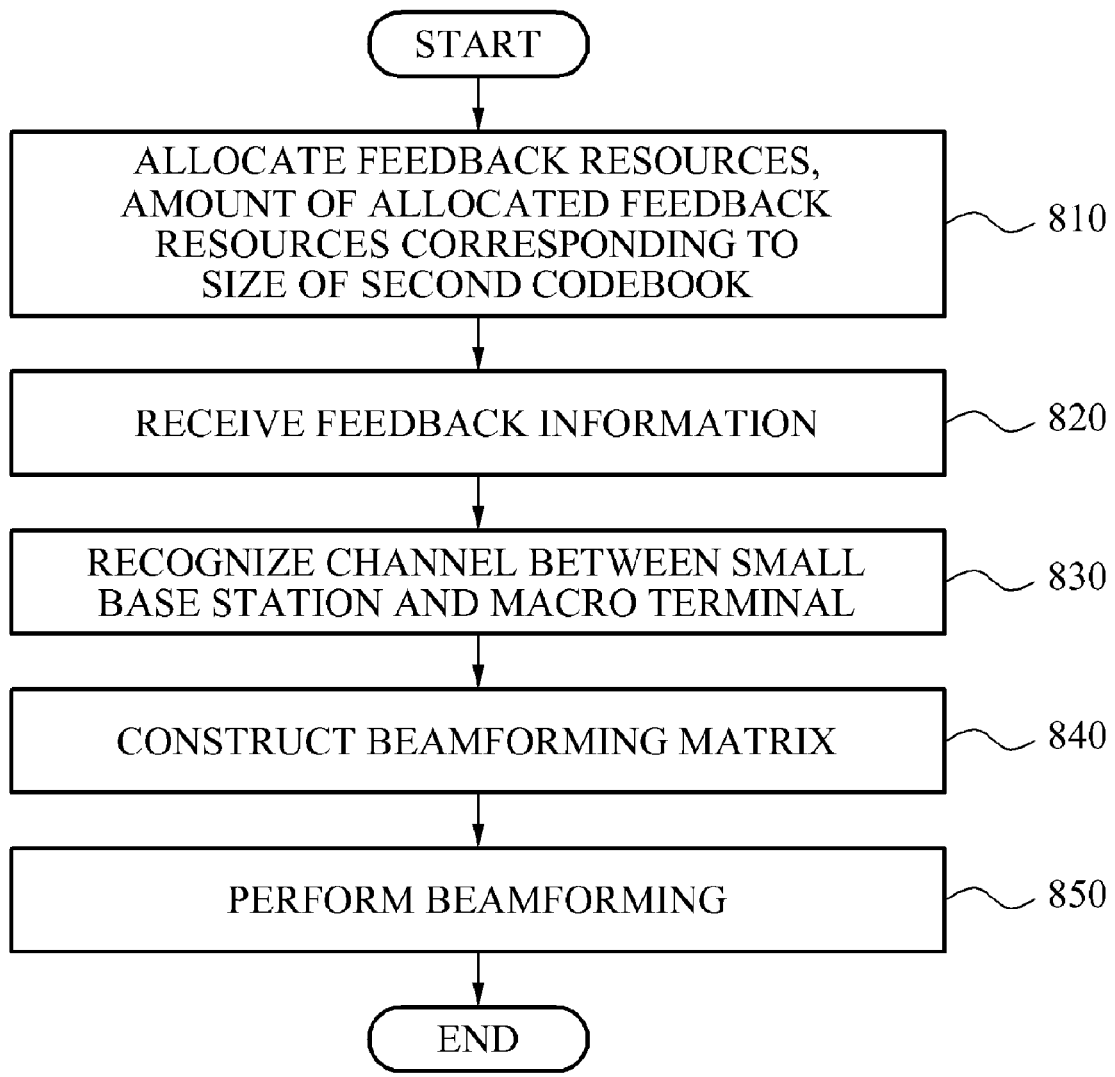
FIG. 8 is a flowchart illustrating an example of a method of a small base station in a codebook-based communication system.

FIG. 8 illustrates an example of a method of a small base station in a codebook-based communication system.

Referring to FIG. 8, in the codebook-based communication system, a small base station allocates feedback resources in operation 810. The amount of the allocated feedback resources may be based on the size of a second codebook for a small cell. The target terminal may generate feedback information including a PMI, CQI, and an RI, and may transmit the feedback information to the small base station using the feedback resources.

In operation 820, the small base station receives the feedback information using the feedback resources allocated in advance. Also, the small base station may determine the PMI, the CQI, and the RI included in the feedback information.

In operation 830, the small base station recognizes or predicts a channel or an interference channel between the small base station and a macro terminal. There are a variety of methods where the small base station recognizes the interference channel For example, the small base station may receive, from a macro base station, information associated with the interference channel between the small base station and the macro terminal. Based on the received information, the small base station may recognize or predict the interference channel. For example, the macro terminal may select a desired beam or an undesired beam of the small base station based on the interference channel, and may transmit, to the macro base station, information associated with the desired beam or the undesired beam. In this example, the macro base station may transmit the information associated with the desired beam or the undesired beam to the small base station through a backhaul, and the small base station may recognize or predict the interference channel based on the transmitted information, and construct a beamforming matrix.

The small base station may recognize or predict the interference channel between the small base station and the macro terminal based on channel reciprocity. The small base station may estimate a downlink channel (interference channel) to the macro terminal from the small base station. For example, the estimated downlink channel may be based on an uplink channel from the macro terminal to the small base station, in a time division duplexing (TDD) system. In addition, the small base station may calculate a covariance channel matrix of the interference channel, and may recognize or predict the interference channel based on the covariance channel matrix, in a frequency division duplexing (FDD) system.

In operation 840, the small base station may construct an optimal beamforming matrix based on the interference channel between the small base station and the macro terminal and feedback information transmitted from a small terminal. For example, the small base station may have candidate beamforming matrixes. The number of the candidate beamforming matrixes may correspond to the size of a second code. Accordingly, the small base station may determine, as a beamforming matrix, one of the candidate beamforming matrixes, based on the interference channel and the feedback information transmitted from the small terminal.

When an optimal beamforming matrix is constructed, in operation 850 the small base station may perform beamforming of at least one data steam based on the beamforming matrix.

Figure 9:
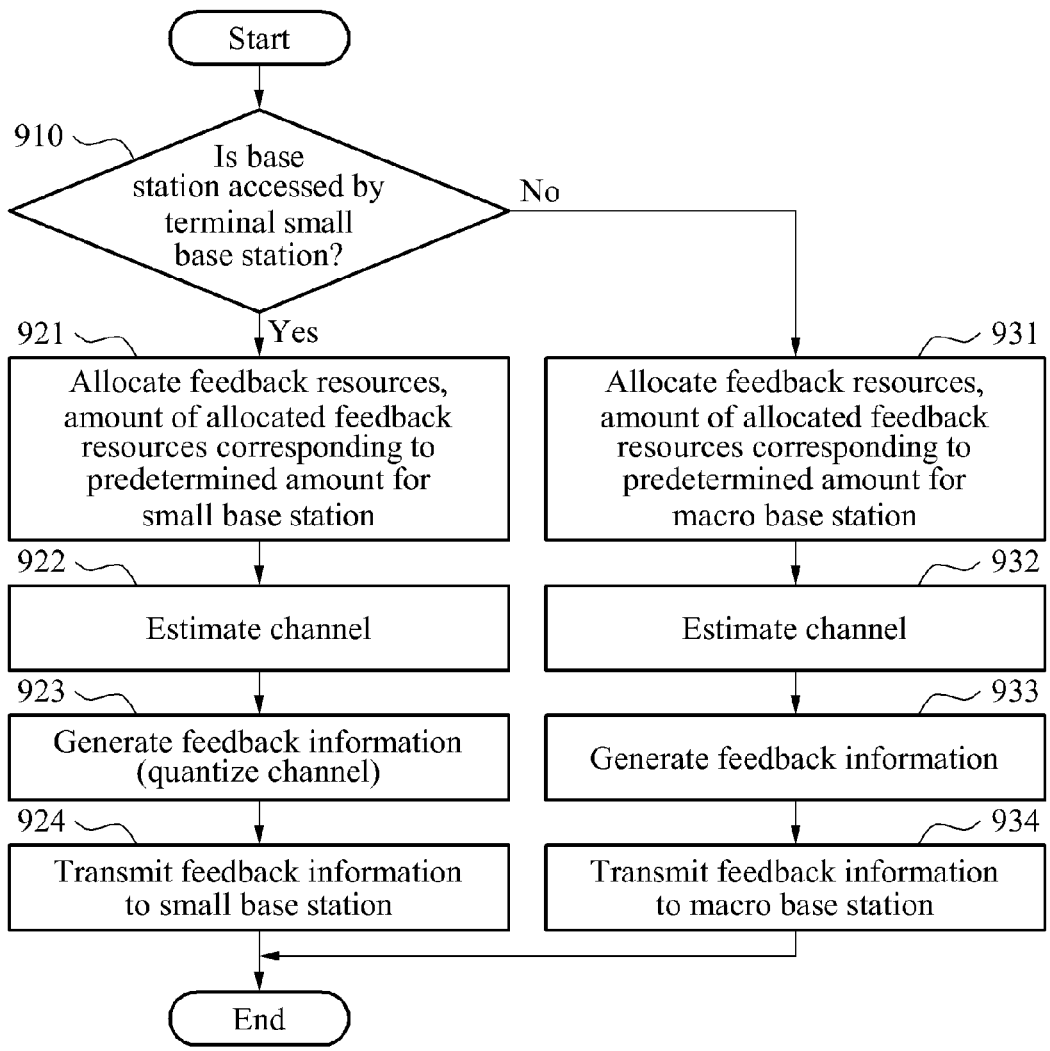
FIG. 9 is a flowchart illustrating an example of a method of a terminal in a non-codebook-based communication system.

FIG. 9 illustrates an example of a method of a terminal in a non-codebook-based communication system.

Referring to FIG. 9, in operation 910 a target terminal determines whether a base station accessed by the target terminal is a small base station. The amount of feedback information generated by the target terminal and the amount of feedback resources allocated for the feedback information may be changed based on the base station that the terminal accesses such as a small base station or a macro base station.

When the target terminal accesses the small base station, in operation 921 the target terminal allocates feedback resource the amount of which may correspond to a predetermined amount for the small base station. For example, the amount of the feedback resources may be 10 bits when the target terminal accesses the small base station, whereas the amount of the feedback resources may be 8 bits when the target terminal accesses the macro base station. In this example, when the target terminal accesses the small base station, a larger amount of feedback resources may be allocated to the target terminal.

In operation 922, the target terminal estimates a channel between the small base station and the target terminal, and may quantize the estimated channel to generate feedback information in operation 923. In this example, the feedback information may include a quantized channel, and may additionally include an RI. In operation 924, the target terminal transmits the feedback information to the small base station using the feedback resources allocated in advance.

When the base station accessed by the target terminal is the macro base station, in operation 931 the target terminal allocates feedback resources for transmission of feedback information the amount of which may correspond to a predetermined amount for the macro base station. In operation 932, the target terminal estimates a channel between the macro base station and the target terminal, and quantizes the estimated channel to generate the feedback information in operation 933. In operation 934, the target terminal transmits the feedback information to the macro base station using the feedback resources allocated in advance.

Figure 10:
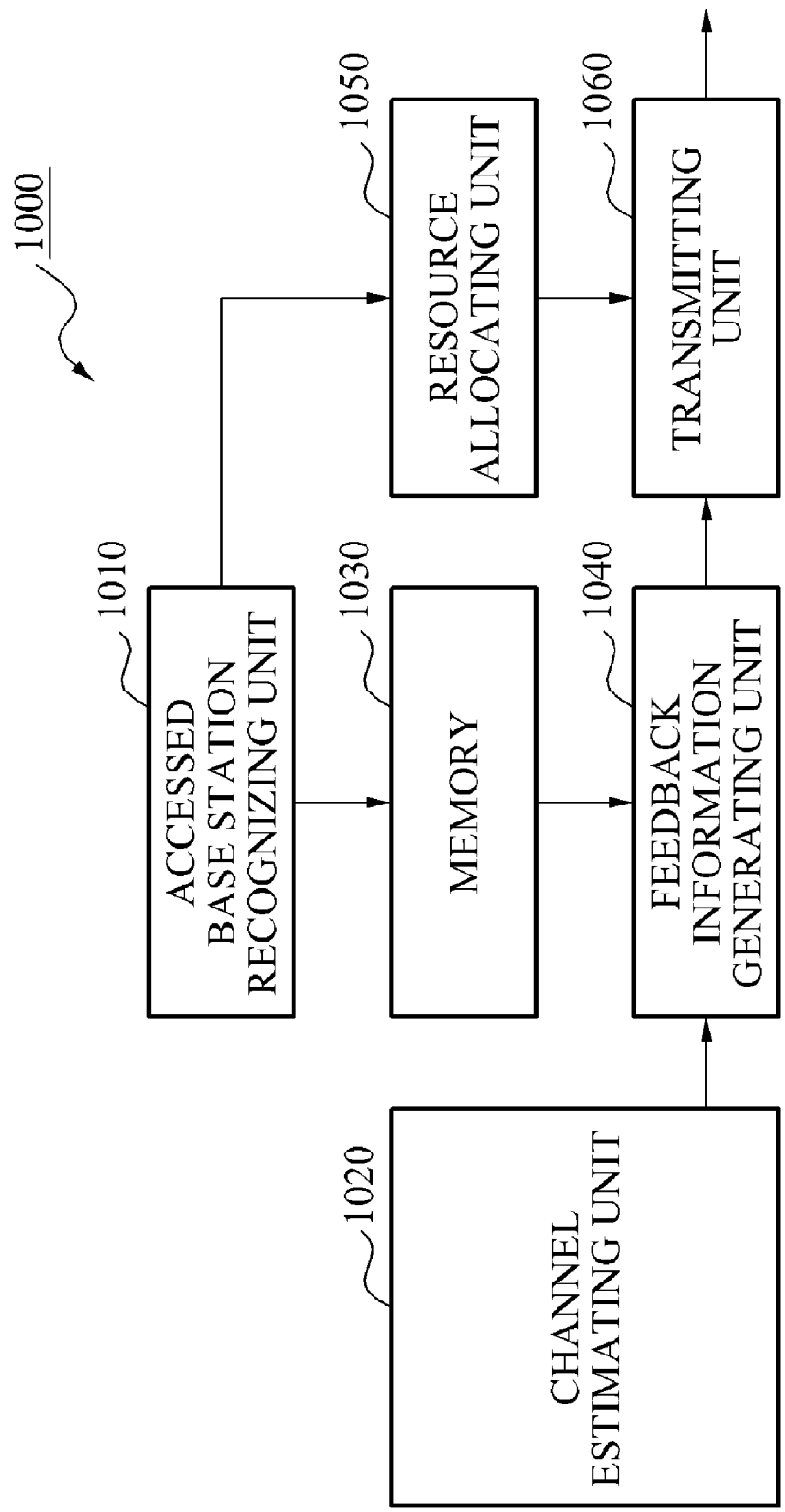
FIG. 10 is a diagram illustrating an example of a terminal.

FIG. 10 illustrates an example of a terminal.

Referring to FIG. 10, terminal 1000 includes an accessed base station recognizing unit 1010, a channel estimating unit 1020, a memory 1030, a feedback information generating unit 1040, a resource allocating unit 1050, and a transmitting unit 1060.

The accessed base station recognizing unit 1010 may determine a base station that the terminal accesses, for example, a small base station or a macro base station. A result of the determination of the accessed base station recognizing unit 1010 may be transmitted to the resource allocating unit 1050 and the memory 1030.

The channel estimating unit 1020 may estimate a channel between the accessed base station and the terminal, and the feedback information generating unit 1040 may generate feedback information based on the estimated channel. In this example, the feedback information generating unit 1040 may generate the feedback information based on a codebook or by quantizing the channel.

When the feedback information generating unit 1040 generates the feedback information based on the codebook, the codebook provided from the memory 1030 to the feedback information generating unit 1040 may be changed based on the accessed base station. The memory 1030 may store a first codebook for a macro cell and a second codebook for a small cell. The memory 1030 may transmit the first codebook to the feedback information generating unit 1040 when the terminal 1000 accesses the macro base station, and the memory 1030 may transmit the second codebook to the feedback information generating unit 1040 when the terminal 1000 accesses the small base station.

The resource allocating unit 1050 may allocate the feedback resources based on the accessed base station. For example, the resource allocating unit 1050 may allocate a larger amount of feedback resources when the terminal 1000 accesses the small base station, and may allocate a smaller amount of feedback resources when the terminal 1000 accesses the macro base station.

The transmitting unit 1060 may transmit the feedback information to the accessed base station based on the allocated feedback resources.

Figure 11:
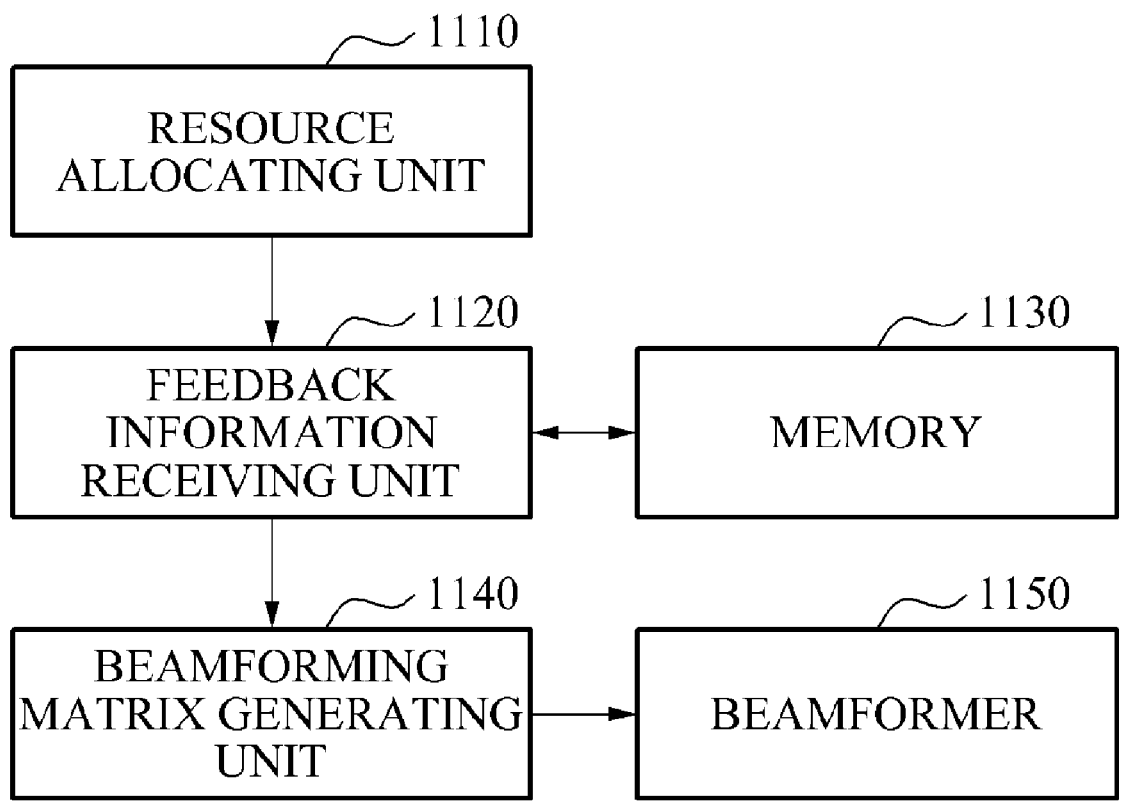
FIG. 11 is a diagram illustrating an example of a macro base station.

FIG. 11 illustrates an example of a macro base station.

Referring to FIG. 11, macro base station 1100 includes a resource allocating unit 1110, a feedback information receiving unit 1120, a memory 1130, a beamforming matrix generating unit 1140, and a beamformer 1150.

When it is determined that a terminal accesses the macro base station 1100, the resource allocating unit 1110 may allocate feedback resources to receive feedback information having a predetermined format. The feedback information receiving unit 1120 may receive feedback information transmitted from the terminal using the allocated feedback resources. In this example, when the feedback information is generated based on a codebook, the feedback information receiving unit 1120 may analyze the feedback information based on a first codebook for a macro cell that is stored in the memory 1130. Conversely, when the feedback information includes a quantized channel, the feedback information receiving unit 1120 may recognize a channel itself based on the feedback information.

The beamforming matrix generating unit 1140 may generate a beamforming matrix for a macro terminal based on the feedback information including. The feedback information may include, for example, a quantized channel, a PMI, a CQI, an RI, and the like. The beamformer 1150 may perform beamforming of at least one data stream based on the beamforming matrix.

Figure 12:
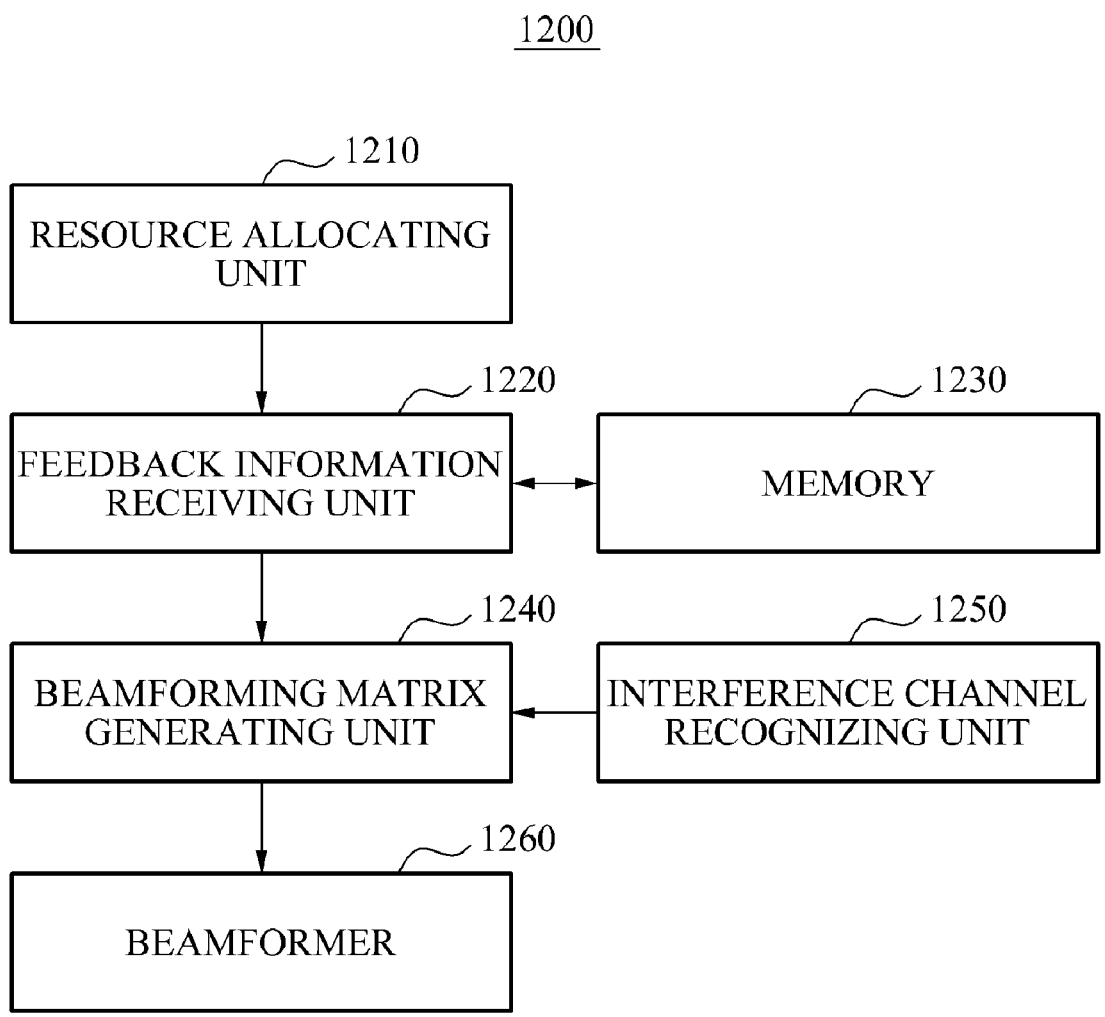
FIG. 12 is a diagram illustrating an example of a small base station.

FIG. 12 illustrates an example of a small base station.

Referring to FIG. 12, small base station 1200 includes a resource allocating unit 1210, a feedback information receiving unit 1220, a memory 1230, a beamforming matrix generating unit 1240, an interference channel recognizing unit 1250, and a beamformer 1260.

The resource allocating unit 1210 may allocate feedback resources for reception of feedback information from a terminal, based on the small base station 1200. For example, the amount of allocated feedback resources may correspond to a size of a second codebook for the small base station 1200, wherein the second codebook is distinguished from a first codebook for a macro base station.

The feedback information receiving unit 1220 may receive feedback information transmitted from the terminal using the allocated feedback resources. In this example, when the feedback information is generated based on a codebook, the feedback information receiving unit 1220 may analyze the feedback information based on the second codebook for the small cell, and the second codebook may be stored in the memory 1230. In some embodiments, when the feedback information includes a quantized channel, the feedback information receiving unit 1220 may recognize the channel based on the feedback information.

The interference channel recognizing unit 1250 may recognize an interference channel to the macro terminal from the small base station 1200. As described above, there may be a variety of methods for recognizing the interference channel.

The beamforming matrix generating unit 1240 may generate a beamforming matrix based on the feedback information and the interference channel, and the beamformer 1260 may perform beamforming based on the beamforming matrix.

The examples described with reference to FIGS. 1 through 9 may be applicable to the terminal, the macro base station, and the small base station.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for a target terminal, the method comprising:
storing a first codebook for a macro base station and a second codebook for a small base station;
allocating feedback resources corresponding to the second codebook;
generating feedback information associated with a channel between the small base station and the target terminal using the second codebook; and
transmitting, to the small base station, the feedback information using the allocated feedback resources.

2. The method of claim 1, wherein a size of the second codebook is greater than a size of the first codebook.

3. The method of claim 1, wherein the generating comprises:
selecting at least one of a plurality of codewords included in the second codebook based on the channel between the small base station and the target terminal,
wherein the feedback information comprises a preferred matrix index (PMI) associated with the at least one of a plurality of codewords included in the second codebook.

4. The method of claim 3, wherein the feedback information further comprises channel quality information (CQI) associated with the channel and/or a rank indicator (RI) indicating a preferred channel rank.

5. The method of claim 1, further comprising estimating the channel between the small base station and the target terminal using a known signal transmitted from the small base station.

6. The method of claim 1, wherein:
the allocating allocates feedback resources; and
the amount of allocated feedback resources corresponds to a size of the second codebook.

7. The method of claim 1, further comprising determining a base station that the target terminal accesses from among the macro base station and the small base station.

8. The method of claim 7, wherein, in response to the target terminal accessing the macro base station, the method further comprises:
selecting the first codebook from among the first codebook and the second codebook;
allocating feedback resource corresponding to the first codebook;
generating feedback information associated with a channel between the macro base station and the target terminal using the first codebook; and
transmitting the feedback information, to the macro base station, using the allocated feedback resources.

9. A method for a target terminal, the method comprising:
determining a base station that the target terminal accesses from among a macro base station and a small base station;
allocating feedback resources in response to the target terminal accessing the small base station, wherein the amount of allocated feedback resources corresponds to a predetermined amount of allocated feedback resources for the small base station;
generating feedback information associated with a channel between the small base station and the target terminal based on the allocated feedback resource; and
transmitting, to the small base station, the feedback information using the allocated feedback resources.

10. The method of claim 9, wherein the allocating allocates a larger amount of feedback resources if the target terminal accesses the small base station than if the target terminal accesses the macro base station.

11. The method of claim 10, further comprising:
estimating the channel between the small base station and the target terminal using a known signal transmitted from the small base station,
wherein the generating comprises quantizing the estimated channel based on the allocated feedback resources.

12. A method for a small base station, the method comprising:
allocating feedback resources corresponding to a second codebook for a—the small base station, the second codebook being distinguished from a first codebook for a macro base station;
analyzing, based on the second codebook, feedback information transmitted through the feedback resources, the feedback information being associated with a channel between a target terminal and the small base station;
recognizing or predicting a channel between the small base station and a macro terminal corresponding to the macro base station; and
constructing a beamforming matrix for the target terminal based on the feedback information and the channel between the small base station and the macro terminal.

13. The method of claim 12, wherein the recognizing or predicting comprises at least one of:
recognizing or predicting the channel between the small base station and the macro terminal by receiving, from the macro base station, information associated with the channel between the small base station and the macro terminal; and
recognizing or predicting the channel between the small base station and the macro terminal based on a channel reciprocity.

14. The method of claim 12, wherein a size of the second codebook is greater than a size of the first codebook.

15. The method of claim 12, wherein the constructing constructs the beamforming matrix based on an interference occurring in the macro terminal due to the small base station.

16. The method of claim 12, wherein the analyzing comprises determining, from the feedback information, a PMI of the target terminal associated with at least one of a plurality of codewords included in the second codebooks.

17. A method of a small base station, the method comprising:
allocating feedback resources in response to a target terminal accessing the small base station, the amount of allocated feedback resources corresponding to a predetermined amount for the small base station;
analyzing feedback information transmitted through the feedback resources, the feedback information being generated by quantizing a channel between the target terminal and the small base station;
recognizing or predicting the channel between the small base station and a macro terminal corresponding to a macro base station; and constructing a beamforming matrix for the target terminal based on the feedback information and the channel between the small base station and the macro terminal.

18. The method of claim 17, wherein the allocating allocates a larger amount of feedback resources if the target terminal accesses the small base station than if the target terminal accesses the macro base station.

19. A non-transitory computer-readable storage medium having stored therein instructions for causing a processor to implement a method of a target terminal, the method comprising:

storing a first codebook for a macro base station and a second codebook for a small base station;

allocating feedback resources corresponding to the second codebook;

generating feedback information associated with a channel between the small base station and the target terminal using the second codebook; and transmitting, to the small base station, the feedback information using the allocated feedback resources.

20. A terminal comprising:

a memory configured to store a first codebook for a macro base station and a second codebook for a small base station;

a feedback generator configured to generate feedback information associated with a channel between the small base station and the target terminal using the second codebook; and a transmitter configured to transmit, to the small base station, the feedback information generated using the second codebook.

21. The terminal of claim 20, wherein the second codebook for the small base station is greater in size that the first codebook for the macro base station.

22. A small base station comprising:

a resource allocator configured to allocate, to a target terminal, feedback resources corresponding to a second codebook for the small base station, the second codebook being distinguished from a first codebook for a macro base station;

a receiver configured to analyze, based on the second codebook, feedback information transmitted by the target terminal using the feedback resources, the feedback information being associated with a channel between the target terminal and the small base station;

an interference recognizer configured to recognize or predict a channel between the small base station and a macro terminal corresponding to the macro base station; and a beamformer configured to construct a beamforming matrix for the target terminal based on the feedback information and the channel between the small base station and the macro terminal.

23. The small base station of claim 22, wherein the second codebook for the small base station is greater in size that the first codebook for the macro base station.

* * * * *